United States Patent Office.

HARRY P. WITBECK, OF ROCHESTER, NEW YORK.

Letters Patent No. 61,978, dated February 12, 1867; antedated August 12, 1866.

---

IMPROVEMENT IN THE MANUFACTURE OF VINEGAR.

---

The Schedule referred to in these Letters Patent and making part of the same.

---

TO ALL WHOM IT MAY CONCERN:

Be it known that I, HARRY P. WITBECK, of Rochester, in the county of Monroe, and State of New York, have invented a new and useful Process for Making Vinegar and Acetic Acid; and I do hereby declare that the following is a full and exact description thereof.

It has long been attempted to produce vinegar by a quick process from malt, wine, alcohol, beer, wood, and many other substances, but the process has been comparatively slow, owing to the difficulties of oxidation, which principle, as is well known, is the agent in producing acidification. It is the object of my improvement not only to produce a superior liquid or body for the vinegar stock preparatory to acidification, and to properly clarify or purify the same, but also to accomplish after this purification the most rapid and effective acidulation by confining the liquid in a vacuum and admitting a charge of pure oxygen to act upon the liquid while under agitation.

The materials I use in the production of the liquid, and the proportions of the same, are as follows: 29 pounds corn-meal, or equivalent; 3 pounds ground rye; 1 pound ground malt; 1 pound ground oats.

The proportions may be varied more or less, as may be desired.

This compound is thoroughly mixed and steam is injected to raise the temperature to 180° or 190°, after which the temperature of the mixture is reduced to 90°, or below, by the addition of cold water or otherwise. It is then drawn into a vat or tub and a ferment added until the mixture is wholly or in great part fermented. This fermented product is then transferred to a filter, which is preferably constructed with alternate layers of gravel and charcoal with a strainer cloth or cloths at suitable positions, and a copper-wire gauze diaphragm raised a suitable distance above the bottom of the filter, so as to allow the purified liquid to collect in the reservoir beneath. I saturate the cloths with dilute muriatic acid for the purpose of neutralizing the saline and alkaline properties in the charcoal. The filter clarifies and purifies the liquid by freeing it of all extraneous matter, but at the same time retains the qualities necessary to produce acid. It also produces all the vinegar stock from the grain or other materials employed. From the filter the purified liquid is transferred to an airtight tank or receiver, from which the air is exhausted by means of a pump. In this tank is situated an agitator of any suitable construction, and operated in any suitable manner so as to thoroughly agitate the liquid. This tank is provided with an eduction outlet for the discharge of the contents, and also with an induction pipe for the admission of pure oxygen. The tank is filled to a suitable degree before the air is exhausted, say half or two-thirds full. The oxygen is then admitted and the liquid therein is agitated into foam. This agitation thoroughly impregnates the liquid with the oxygen. The method of acidification heretofore has been to expose the liquid as much as possible to the air, the oxygen of which is the only agent that produces the desired result. It is obvious that if I can remove the air and replace it by oxygen alone, that a much more perfect and rapid oxidation will be produced and the vinegar will be of as good a quality. The combined use of the filter and vacuum process, as described, produces vinegar or acetic acid of the best quality. The process of filtering is essential in clarifying the stock, while the oxidation in vacuo completes the acidification in the most expeditious and perfect manner.

What I claim as my invention, is—

The process of producing a liquid for vinegar or acetic acid from the product of the mixture of grains, as herein described, by passing the same through a filter for the purpose of purification, substantially as herein specified.

I also claim the rapid process of acidulating the liquid by subjecting it to a charge of pure oxygen, as herein specified.

In witness whereof I have hereunto signed my name in the presence of two subscribing witnesses.

HARRY P. WITBECK.

Witnesses:
R. F. OSGOOD,
J. A. DAVIS.